(12) United States Patent
Seki

(10) Patent No.: US 8,094,853 B2
(45) Date of Patent: Jan. 10, 2012

(54) SPEAKER SYSTEM AND FITTING DEVICE

(75) Inventor: Hideki Seki, Saitama (JP)

(73) Assignee: Sony Corporation, Tokyo (JP)

( * ) Notice: Subject to any disclaimer, the term of this patent is extended or adjusted under 35 U.S.C. 154(b) by 813 days.

(21) Appl. No.: 12/229,055

(22) Filed: Aug. 19, 2008

(65) Prior Publication Data

US 2009/0052722 A1   Feb. 26, 2009

(30) Foreign Application Priority Data

Aug. 24, 2007   (JP) .................................. 2007-217909

(51) Int. Cl.
*H04R 1/02* (2006.01)
(52) U.S. Cl. ........ 381/337; 381/349; 381/386; 381/388; 181/156; 181/196; 181/199; 181/224; 138/95; 138/156; 138/162; 138/168; 285/134.1; 285/135.1; 285/223
(58) Field of Classification Search .......... 381/337–338, 381/341, 345, 349, 351, 386–388; 181/153–156, 181/196–199, 224; 138/92–95, 156, 162, 138/168, 223; 285/134.1, 135.1
See application file for complete search history.

(56) References Cited

U.S. PATENT DOCUMENTS

| | | | | |
|---|---|---|---|---|
| 4,951,716 A | * | 8/1990 | Tsunoda et al. ............... | 138/162 |
| 5,531,345 A | * | 7/1996 | Nakamura et al. ............. | 220/3.8 |
| 5,929,380 A | * | 7/1999 | Carlson et al. ................ | 174/68.3 |
| 6,560,343 B1 | * | 5/2003 | Kim .............................. | 381/349 |
| 6,658,127 B1 | * | 12/2003 | Kim .............................. | 381/340 |
| 6,851,722 B2 | * | 2/2005 | Chiu et al. .................. | 285/134.1 |
| 2001/0037910 A1 | * | 11/2001 | Coffin ........................... | 181/199 |
| 2007/0215407 A1 | * | 9/2007 | Chiang ......................... | 181/156 |

FOREIGN PATENT DOCUMENTS

| | | |
|---|---|---|
| JP | 2003-061177 | 2/2003 |
| JP | 2003-324795 | 11/2003 |
| JP | 2006-253948 | 9/2006 |

* cited by examiner

*Primary Examiner* — Michael Trinh
(74) *Attorney, Agent, or Firm* — Wolf, Greenfield & Sacks, P.C.

(57) ABSTRACT

A speaker system includes a cabinet, a front baffle, a speaker unit, a rear baffle, and a fitting member fitted in the rear baffle. The front baffle includes a front duct segment extending backward from the rear thereof. The rear baffle includes an opening portion, a duct connecting portion, and a receiving portion having a semicircular cross section. The receiving portion extends from the opening portion to the duct connecting portion while protruding backward. The opening portion, the receiving portion, and the duct connecting portion have a groove. The receiving portion has an engagement hole. The fitting member having a semicircular cross section is formed by double molding. The frame of the member is made of relatively rigid resin and the rim thereof is made of relatively flexible resin. The frame has an engagement projection. The receiving portion and the fitting member constitute a sealed rear duct segment.

6 Claims, 9 Drawing Sheets

SPEAKER SYSTEM AND FITTING DEVICE

CROSS REFERENCES TO RELATED APPLICATIONS

The present invention contains subject matter related to Japanese Patent Application JP 2007-217909 filed in the Japanese Patent Office on Aug. 24, 2007, the entire contents of which are incorporated herein by reference.

BACKGROUND OF THE INVENTION

1. Field of the Invention

The present invention relates to a speaker system including a duct for bass resonance, i.e., of a bass-reflex type and a fitting device used for coupling two tubes.

2. Description of the Related Art

Bass-reflex speaker systems are intended to improve the characteristics of bass and reinforce bass in the following manner: a bass sound generated from the rear of a speaker unit is allowed to pass through a duct in order to invert the phase of the bass sound so that the bass sound has the same phase as that of a bass sound generated from the front of the speaker unit, and the bass sound with the inverted phase is emitted from the front of the speaker unit.

Related-art bass-reflex speaker systems are constructed such that the duct extending in the depth direction of the speaker unit is arranged in a speaker enclosure, as disclosed in Japanese Unexamined Patent Application Publication Nos. 2003-61177 and 2003-324795.

FIG. 9 is a schematic cross-sectional view of such a related-art speaker system. The speaker system includes a speaker enclosure, a speaker unit 1, and a duct 9. The speaker enclosure is composed of a cabinet 10, a front baffle 20, and a rear baffle 30. The speaker unit 1 is disposed in the speaker enclosure such that the speaker unit 1 is attached to an opening 21 of the front baffle 20. The duct 9 is integrated with the front baffle 20.

A bass sound generated from the rear of the speaker unit 1 enters the rear end of the duct 9 and passes through the duct 9, so that the bass sound is emitted forward from the front baffle 20.

Japanese Unexamined Patent Application Publication No. 2006-253948 discloses a bass-reflex speaker apparatus that includes a thin speaker box and is installed in an image display apparatus, such as a television receiver. In this speaker apparatus, a bass-reflex duct is bent so as to have a long path and the duct partially extends in a direction perpendicular to the depth direction of the speaker unit.

SUMMARY OF THE INVENTION

In the above-described speaker system shown in FIG. 9, however, the effective length of the duct 9 is not sufficiently increased because the length of the duct 9 has to be shorter than the depth L of the cabinet 10. Disadvantageously, the effect of reinforcing bass is not exhibited sufficiently.

Although extending the depth L of the cabinet 10 can increase the effective length of the duct 9, the size of the speaker system also increases. Moreover, this is undesirable from the viewpoint of design.

In the speaker system in FIG. 9, it is difficult to form the duct 9 so that the duct 9 has a diverging rear end portion with a large opening, namely, the rear end of the duct 9 has a curved inner surface and a large opening. Unfortunately, the velocity of flow of air in the duct 9 sharply changes, so that wind noise may be easily generated.

A diverging tube having a large opening may be provided as a member separated from the front baffle 20 and be coupled to the rear end of the duct 9. In this case, however, the cost of manufacture increases and the number of assembling steps also increases.

It is desirable to sufficiently increase the effective length of a duct in a bass-reflex speaker system without increasing the size of the speaker system, sufficiently exhibit the effect of reinforcing bass, and reliably seal the duct.

According to an embodiment of the present invention, a speaker system includes a cabinet, a front baffle attached to the front of the cabinet, a speaker unit that is attached to the rear of the front baffle and is received in the cabinet, a rear baffle attached to the rear of the cabinet, and a fitting member fitted in the rear of the rear baffle. The front baffle integrally includes a front duct segment such that the segment extends from the rear of the front baffle. The rear baffle has an opening portion opposed to the rear of the speaker unit, integrally includes a duct connecting portion opposed to the front duct segment, and integrally includes a receiving portion having a semicircular cross section such that the receiving portion extends from the opening portion to the duct connecting portion while protruding backward. The opening portion, the receiving portion, and the duct connecting portion have a groove extending on the rear surfaces of the respective portions. The receiving portion has a hole for engagement in the outer surface thereof adjacent to the groove. The fitting member has a semicircular cross section and is formed by double molding such that the frame of the fitting member is made of a first resin material which is relatively rigid and the rim thereof is made of a second resin material which is relatively flexible. The frame has a projection for engagement on the outer surface thereof. The rear end face of the front duct segment is butted against the front end face of the duct connecting portion such that the interface therebetween is sealed. The receiving portion and the fitting member constitute a rear duct segment while the rim of the fitting member is inserted into the groove up to the bottom thereof and the projection is engaged with the hole.

With the above-described structure, the speaker system according to this embodiment has a duct that extends from the opening portion, serving as the starting end of the duct, of the rear baffle opposed to the rear of the speaker unit to the front of the front baffle through the rear duct segment composed of the receiving portion of the rear baffle and the fitting member, the duct connecting portion included in the rear baffle, and the front duct segment included in the front baffle. Accordingly, the length of the duct can be made sufficiently longer than the depth of the cabinet. Advantageously, the effective length of the duct can be sufficiently increased without increasing the size of the speaker system, so that the effect of reinforcing bass can be sufficiently exhibited.

In addition, since the fitting member is formed by double molding such that the frame thereof is made of the relatively rigid resin material and the rim thereof is made of the relatively flexible resin material, the rim functions as a packing member. Advantageously, the rear duct segment of the duct can also be reliably sealed.

Furthermore, the opening portion of the rear baffle which serves as the starting end of the duct can be easily formed so as to have a large opening and a curved inner surface. Advantageously, a sharp change in the velocity of flow of air in the duct can be prevented, thus suppressing the occurrence of wind noise.

DESCRIPTION OF THE PREFERRED EMBODIMENTS

1. Schematic Structure of Speaker System

Figure 1:
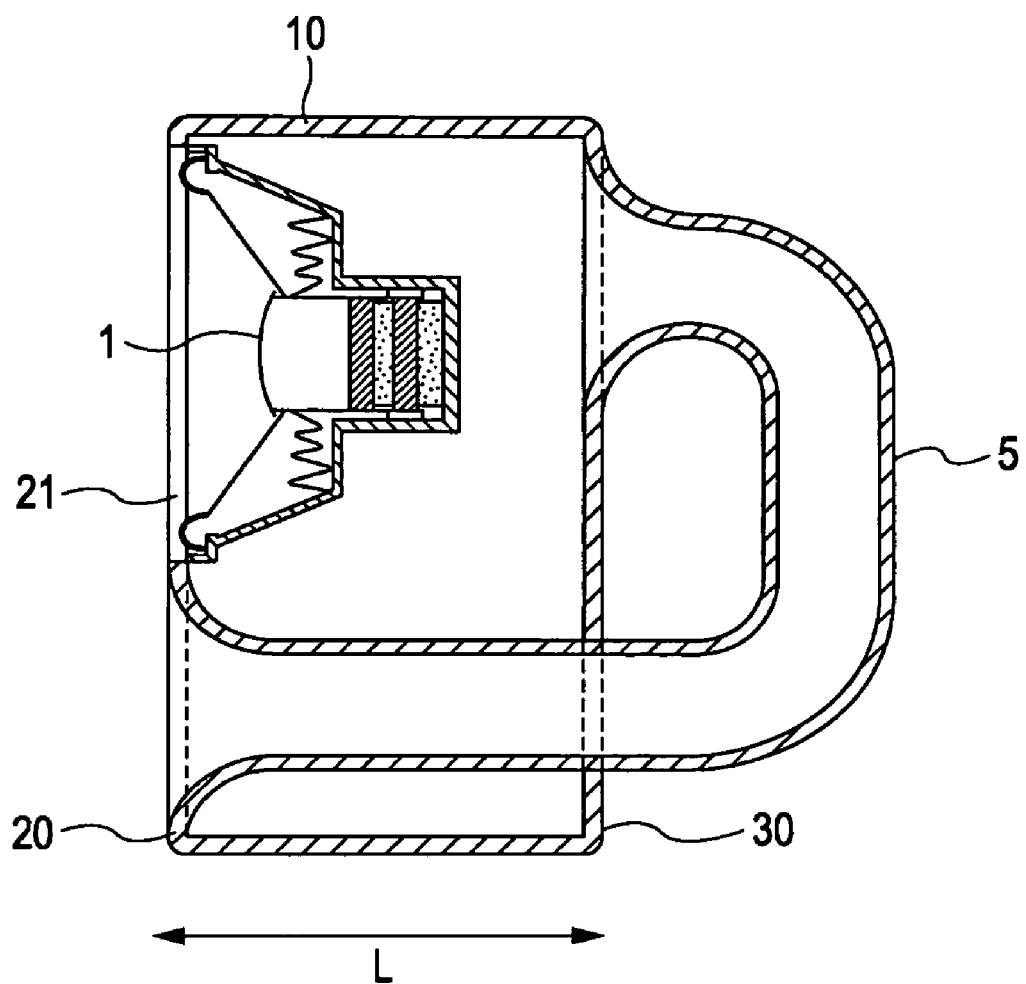
FIG. 1 is a schematic cross-sectional view of a speaker system to which the present invention is applied.

FIG. 1 is a schematic cross-sectional view of a speaker system to which the present invention is applied.

This speaker system includes a duct 5 for bass resonance. The duct 5 extends backward from a rear baffle 30 of a cabinet 10 in a position opposed to the rear of a speaker unit 1, bends so as to pass through the interior of the cabinet 10, and reaches a front baffle 20 so as to be opened.

In this structure, the length of the duct 5 can be made sufficiently longer than the depth L of the cabinet 10. The effective length of the duct 5 can be satisfactorily increased without increasing the size of the speaker system, thus sufficiently exhibiting the effect of reinforcing bass.

Part of the duct 5 extending backward from the front baffle 20 can be integrated with the front baffle 20. However, it is difficult to integrate the rear baffle 30 with all of the other part, including part extending backward from the cabinet 10, of the duct 5 adjacent to the rear baffle 30. It is therefore necessary to combine a separately formed segment of the duct 5 to a segment integrated with the rear baffle 30. Accordingly, ensuring the airtightness of the junction of the segments is a problem.

General methods of ensuring airtightness in combining a component to another component include a method using a gasket, such as urethane rubber or cork, a method using a rubber O-ring or a nonwoven fabric, such as HIMELON (trade name), and a method of applying bond.

As for the method using a gasket, a gasket is easily attached to components. However, when a component has a three-dimensional or curved surface to be joined, a gasket does not follow the shape of the surface to be joined. Disadvantageously, gaskets are used only for butt joining of flat surfaces. In the use of an O-ring, when an O-ring is formed by molding, the O-ring can follow the shape of a surface to be joined to some extent. However, it is difficult to set the O-ring to an intricately-shaped portion or a large portion of a cabinet. A nonwoven fabric is also difficult to follow an intricately-shaped portion. As for the method of applying bond and a method using liquid packing, the work efficiencies are not good. In addition to an increase in the number of processing steps, the amount of bond or liquid packing applied is not constant, thus causing a problem in that a clearance is formed between components, or bond or liquid packing is extruded from the interface therebetween.

To solve the above-described problems, the speaker system to which the present invention is applied has the following structure.

2. Embodiments of Speaker System

Figure 2:
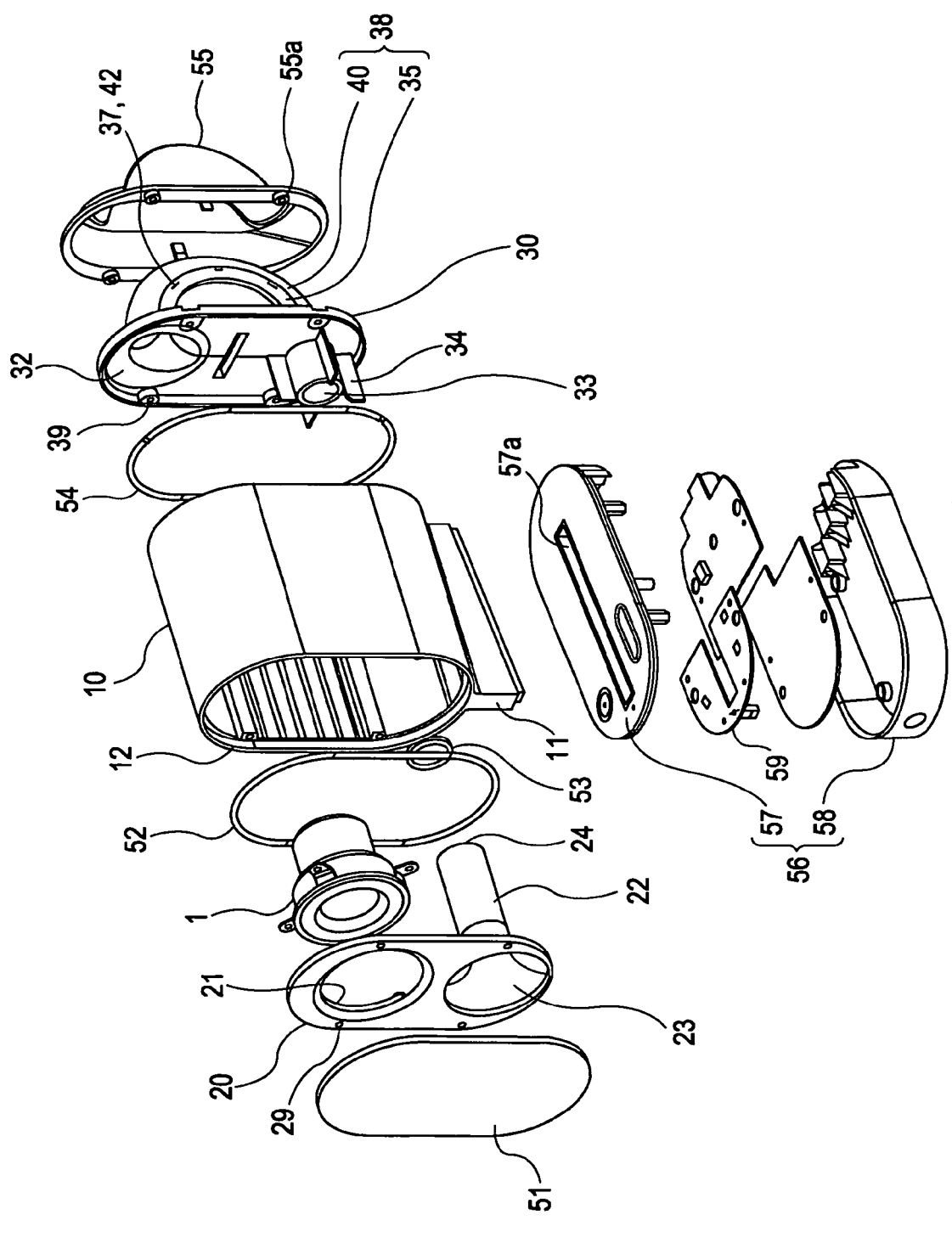
FIG. 2 is an exploded view of a speaker system according to an embodiment of the present invention.

FIG. 2 is an exploded view of a speaker system according to an embodiment of the present invention.

The speaker system according to this embodiment includes the speaker unit 1, the cabinet 10, the front baffle 20, the rear baffle 30, a fitting member 40, a dust mesh 51, rubber packings 52, 53, 54, a rear cover 55, and a base 56.

The cabinet 10, made of aluminum, is shaped into a cylinder having a leg 11 on one side.

The base 56 includes an upper frame 57, a lower frame 58, and a substrate 59 having a circuit that drives the speaker unit 1 such that the substrate 59 is disposed between the frames 57 and 58. The leg 11 of the cabinet 10 is inserted in a slot 57a in the upper frame 57 so that the cabinet 10 is supported by the cabinet 10.

The front baffle 20 is formed by molding, for example, acrylonitrile butadiene styrene (ABS). The front baffle 20 has an opening 21 opposed to the front of the speaker unit 1, holes 29 for attachment, and a front duct segment 22 that is integrated with the front baffle 20 and extends backward.

The front duct segment 22 has an opening portion 23 that has a large front opening and a curved inner surface. The front duct segment 22 has a rear end face 24 that is perpendicular to the direction in which the front duct segment 22 extends.

The speaker unit 1 is attached to the rear of the front baffle 20 so as to be aligned with the opening 21. While the rubber packing 52 is fitted into a front recess 12 of the cabinet 10, the periphery of the front baffle 20 is butted against the front of the cabinet 10. The front baffle 20 is fixed to the cabinet 10 using screws inserted into the holes 29. After that, the front baffle 20 is covered with the dust mesh 51.

The rear baffle 30 is also formed by molding, for example, ABS. The rear baffle 30 has an opening portion 32 that is opposed to the rear of the speaker unit 1, holes 39 for attachment, a duct connecting portion 33, reinforcing ribs 34, and a receiving portion 35, which will be described below, such that the duct connecting portion 33, the reinforcing ribs 34, and the receiving portion 35 are integrated with the rear baffle 30. The duct connecting portion 33 and the reinforcing ribs 34 are opposed to the front duct segment 22 of the front baffle 20. The receiving portion 35 protrudes from the rear surface of the rear baffle 30.

The receiving portion 35 of the rear baffle 30 receives the fitting member 40, which will be described below. The receiving portion 35 and the fitting member 40 constitute a rear duct segment 38.

The rubber packing 53 is fitted to the rear end face 24 of the front duct segment 22 in the front baffle 20, the rubber packing 54 is fitted into a rear recess of the cabinet 10, the fitting member 40 is fitted into the receiving portion 35 of the rear baffle 30, and the rear of the rear baffle 30 and the rear of the fitting member 40 are covered with the rear cover 55. In this state, the front end face of the duct connecting portion 33 is butted against the rubber packing 53 fitted in the front duct segment 22 and the periphery of the rear baffle 30 is butted against the rear of the cabinet 10. After that, the rear baffle 30 and the rear cover 55 are fixed to the cabinet 10 using screws inserted into holes 55a of the rear cover 55 and the holes 39 of the rear baffle 30 while the holes 55a are aligned with the holes 39, respectively.

Figure 3:
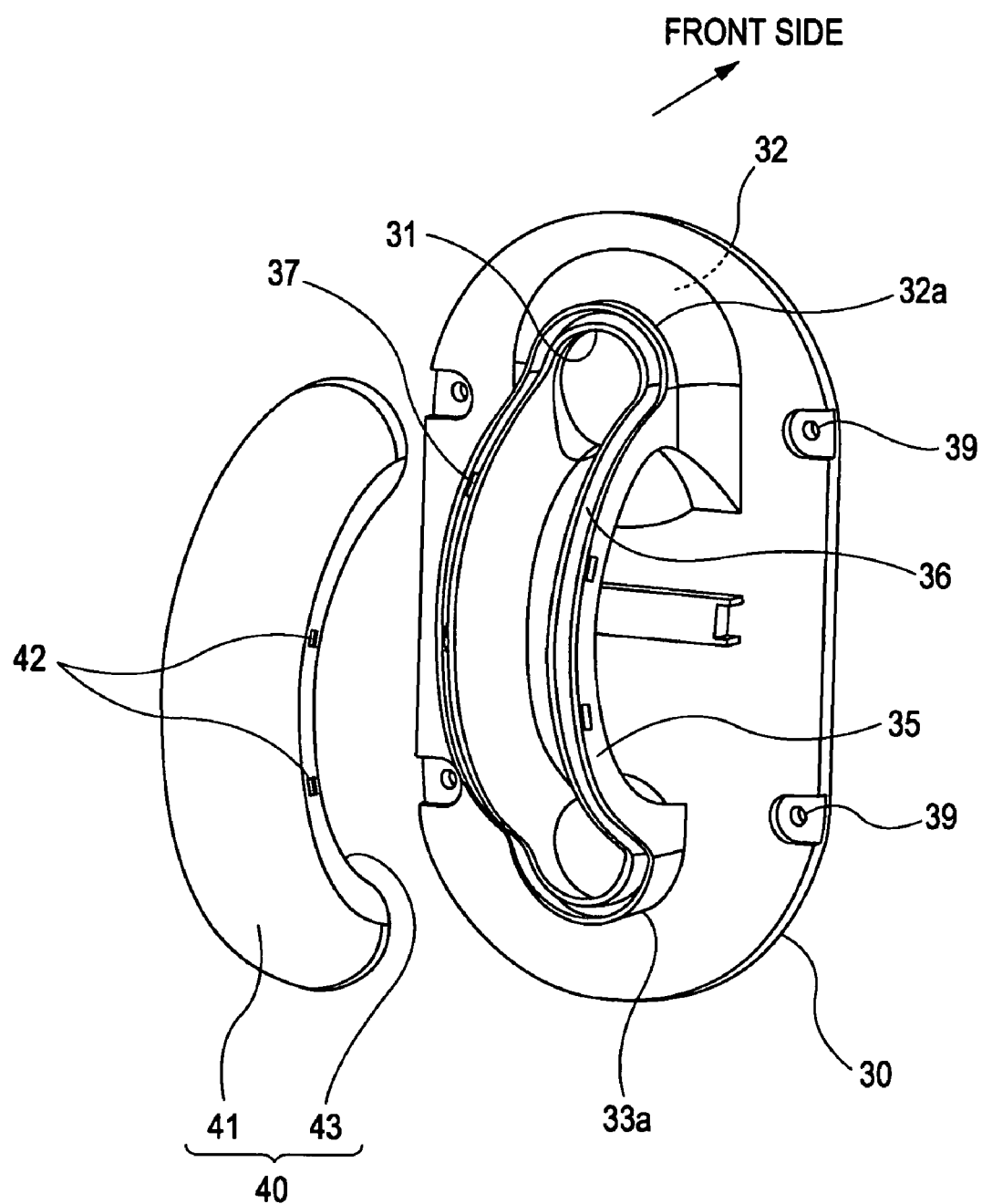
FIG. 3 illustrates a fitting member and a rear baffle in the speaker system according to the embodiment as viewed from the rear side before the fitting member is fitted to the rear baffle.
Figure 4:
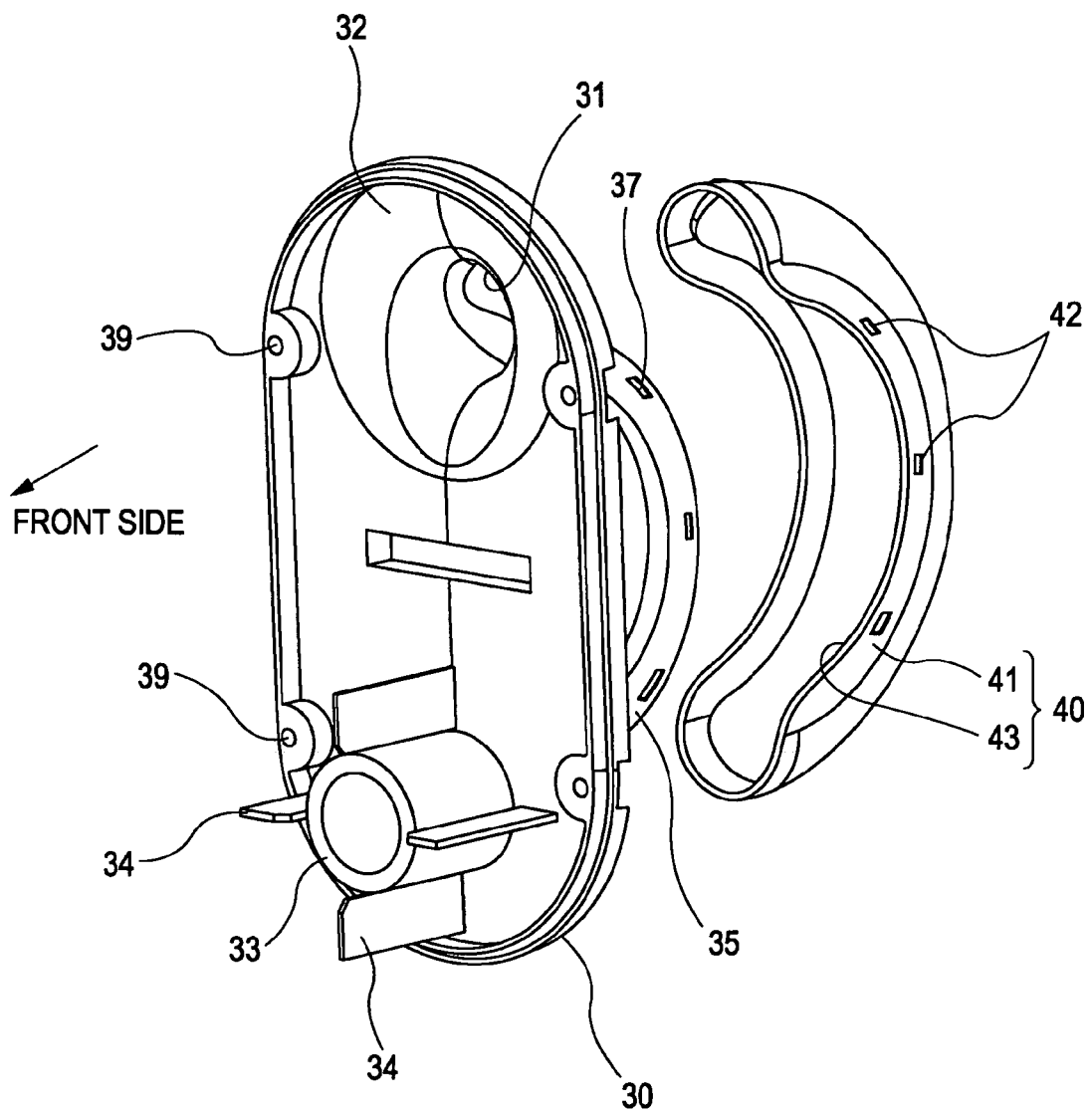
FIG. 4 illustrates the fitting member and the rear baffle in the speaker system according to the embodiment as viewed from the front side before the fitting member is fitted to the rear baffle.
Figure 5:
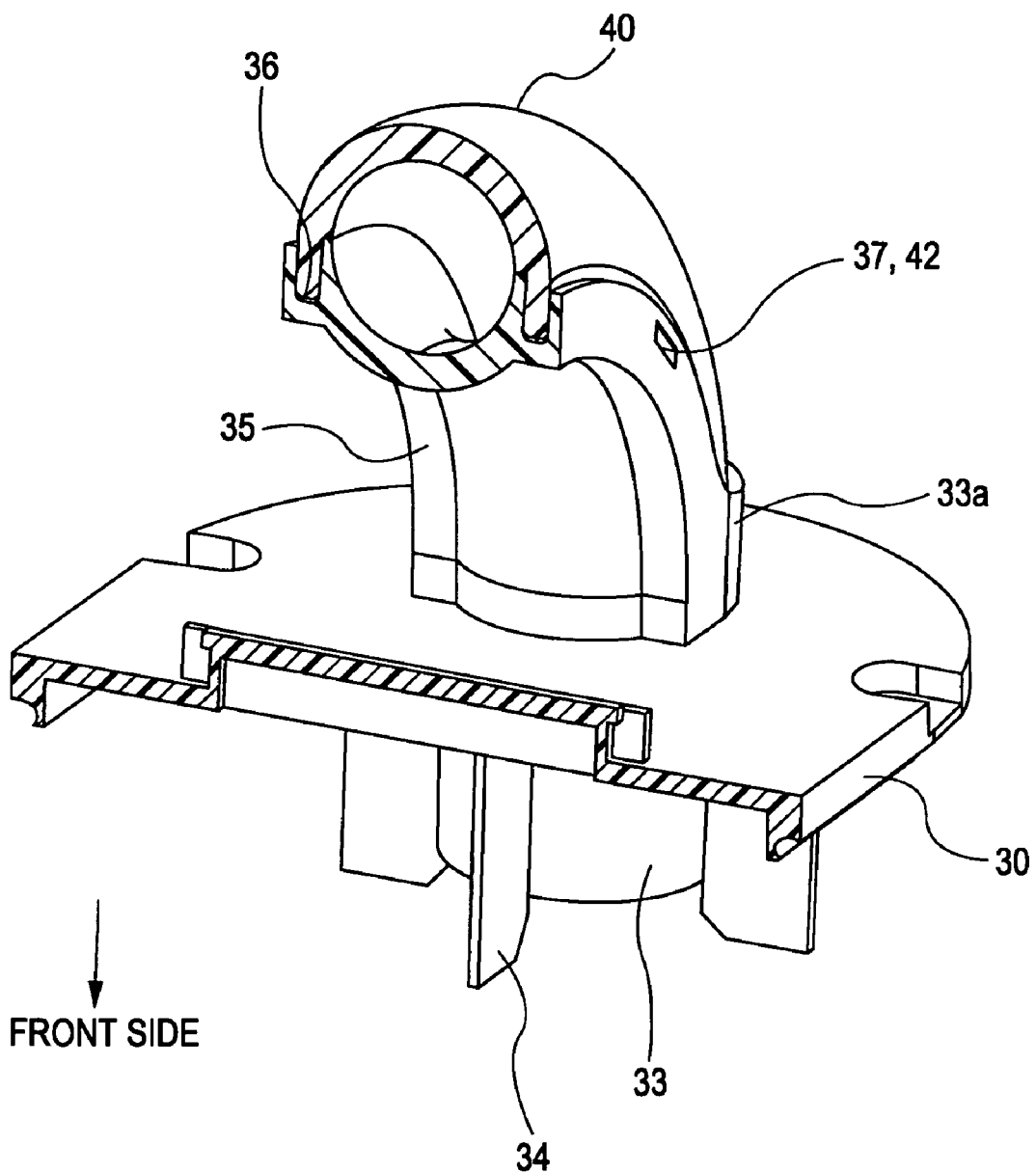
FIG. 5 illustrates the fitting member fitted in the rear baffle with part of the member and part of the rear baffle cut away at the center of the rear baffle.
Figure 6:
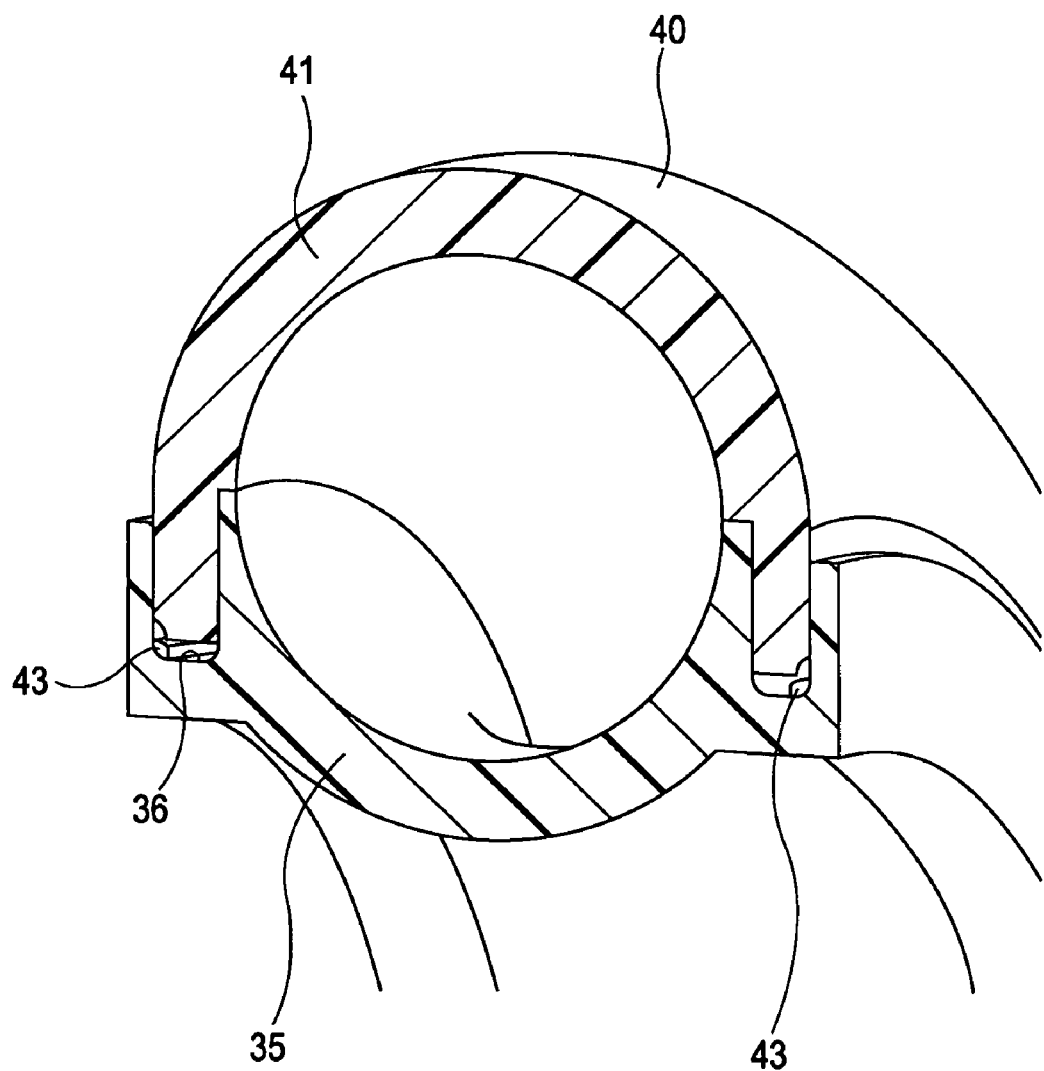
FIG. 6 is an enlarged view of part of FIG. 5.

FIGS. 3 to 6 illustrate the detailed structure of the rear baffle 30 and that of the fitting member 40. FIG. 3 illustrates the fitting member 40 and the rear baffle 30 as viewed from the rear side before the fitting member 40 is fitted to the rear baffle 30. FIG. 4 illustrates the fitting member 40 and the rear baffle 30 as viewed from the front side before the fitting member 40 is fitted to the rear baffle 30. FIG. 5 illustrates the fitting member 40 fitted in the rear baffle 30 with part of the member 40 and part of the rear baffle 30 cut away at the center of the rear baffle 30. FIG. 6 is an enlarged view of part of FIG. 5.

The rear baffle 30 integrally includes the receiving portion 35 such that the receiving portion 35 extends from cylindrical part 32a of the opening portion 32 having an opening 31 to an extension 33a of the duct connecting portion 33 while protruding backward. The receiving portion 35 has a semicircular cross section.

The cylindrical part 32a of the opening portion 32, the receiving portion 35, and the extension 33a of the duct connecting portion 33 have a groove 36 running on the rear surfaces of those three components. The receiving portion 35 has a plurality of holes 37 for engagement on the outer surface thereof adjacent to the groove 36.

The opening portion 32 of the rear baffle 30 has a large opening and a curved inner surface in the same way as the opening portion 23 of the front duct segment 22 in the front baffle 20.

The fitting member 40 having a semicircular cross section is formed by double molding. Specifically, the fitting member 40 includes a frame 41 made of a relatively rigid resin material and a rim 43 made of a relatively flexible resin material. For example, ABS is used as the resin material for the frame 41 and elastomer is used as that for the rim 43.

The frame 41 has a plurality of projections 42 for engagement on the outer surface in the vicinity of the rim 43.

The rim 43 of the fitting member 40 and part of the frame 41 adjacent to the rim 43 are inserted into the groove 36 of the rear baffle 30 so that the rim 43 reaches the bottom of the groove 36, and the projections 42 of the fitting member 40 are engaged with the holes 37 of the rear baffle 30.

In this instance, since the rim 43, made of elastomer, of the fitting member 40 is pressed against the bottom, made of ABS, of the groove 36, the rim 43 is deformed by approximately 0.2 mm as shown in FIG. 6. Accordingly, the rim 43 is in tight contact with the bottom of the groove 36, thus reliably sealing the rear duct segment 38 composed of the receiving portion 35 and the fitting member 40. In addition, since the projections 42 are engaged with the holes 37, the sealed state is held.

In this speaker system, therefore, the effective length of the duct can be sufficiently increased without increasing the size of the speaker system, so that the effect of reinforcing bass is sufficiently exhibited as described above. In addition, the duct extending from the opening portion 32, serving as the starting end of the duct, of the rear baffle 30 to the opening portion 23, serving as the terminating end of the duct, of the opening portion 23 can be reliably sealed.

The sealing structure can be achieved by fitting the fitting member 40 formed by double molding to the rear baffle 30 without using any special tool and increasing the number of assembling steps.

The opening portion 32, serving as the starting end of the duct, of the rear baffle 30 can be easily formed so as to have a large opening and a curved inner surface. Consequently, this prevents a sharp change in the velocity of flow of air in the duct, thus suppressing the occurrence of wind noise.

Instead of sealing with the rubber packing 52 disposed between the front baffle 20 and the cabinet 10 and the rubber packing 54 disposed between the rear baffle 30 and the cabinet 10, another sealing method may be used. For example, the front baffle 20 and the rear baffle 30 may be formed by double molding such that the rim of each baffle is made of a relatively flexible resin material, such as elastomer. The rim of the front baffle 20 and that of the rear baffle 30 may be fitted to the cabinet 10 so that the interface between the front baffle 20 and the cabinet 10 is hermetically sealed and that between the rear baffle 30 and the cabinet 10 is hermetically sealed.

Instead of sealing with the rubber packing 53 disposed between the front duct segment 22 of the front baffle 20 and the duct connecting portion 33 of the rear baffle 30, another sealing method may be similarly used. For example, the front baffle 20 may be formed by double molding such that the rim of the rear end thereof is made of a relatively flexible resin material, such as elastomer. The rim of the rear end of the front duct segment 22 may be fitted to the front end face of the duct connecting portion 33 so that the interface between the front duct segment 22 and the duct connecting portion 33 is hermetically sealed.

3. Embodiments of Fitting Device

The fitting structure in accordance with the present invention can be applied to assemblies other than the duct of the bass-reflex speaker system.

Figure 7:
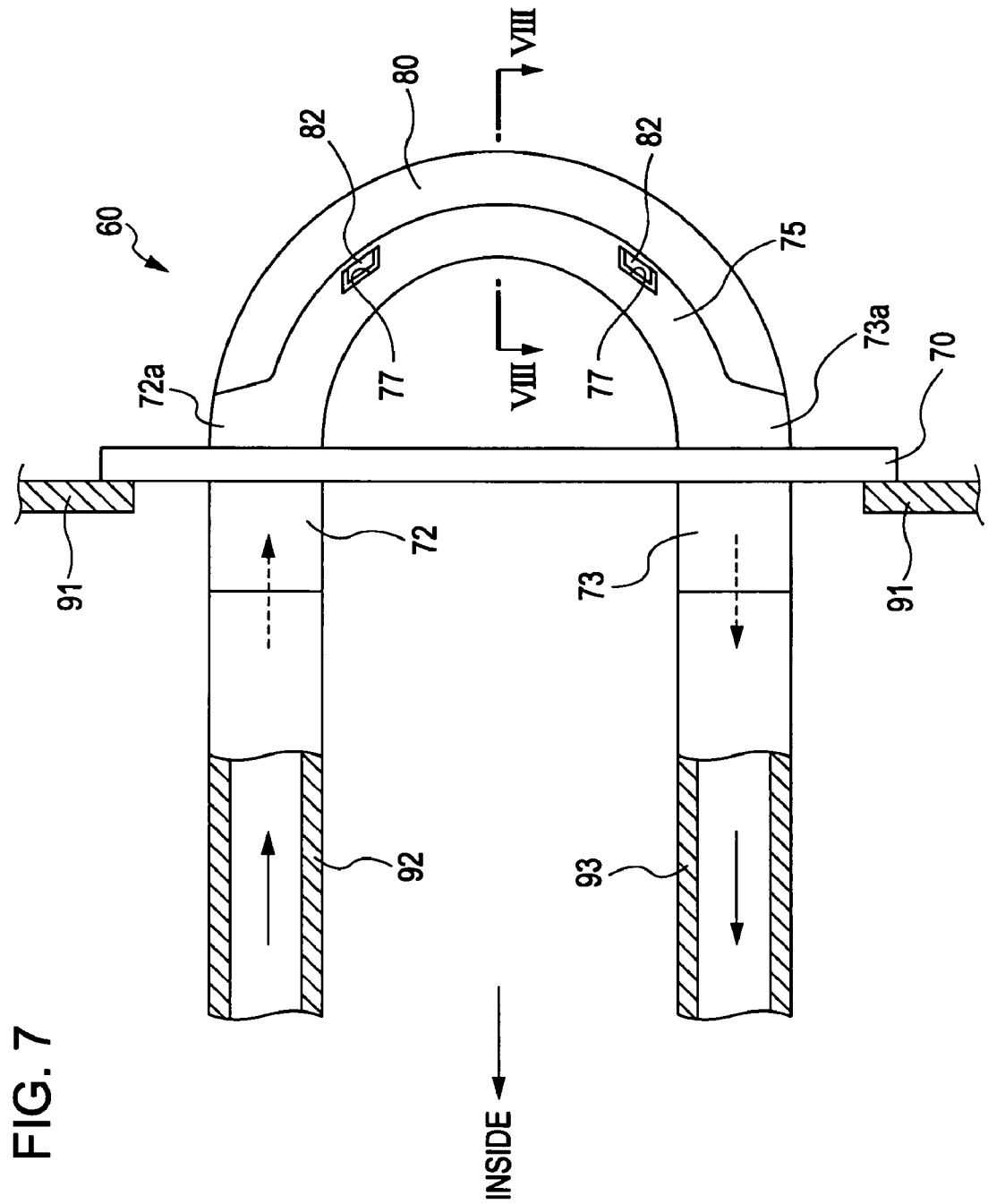
FIG. 7 is a diagram illustrating a fitting device according to an embodiment of the present invention.
Figure 8:
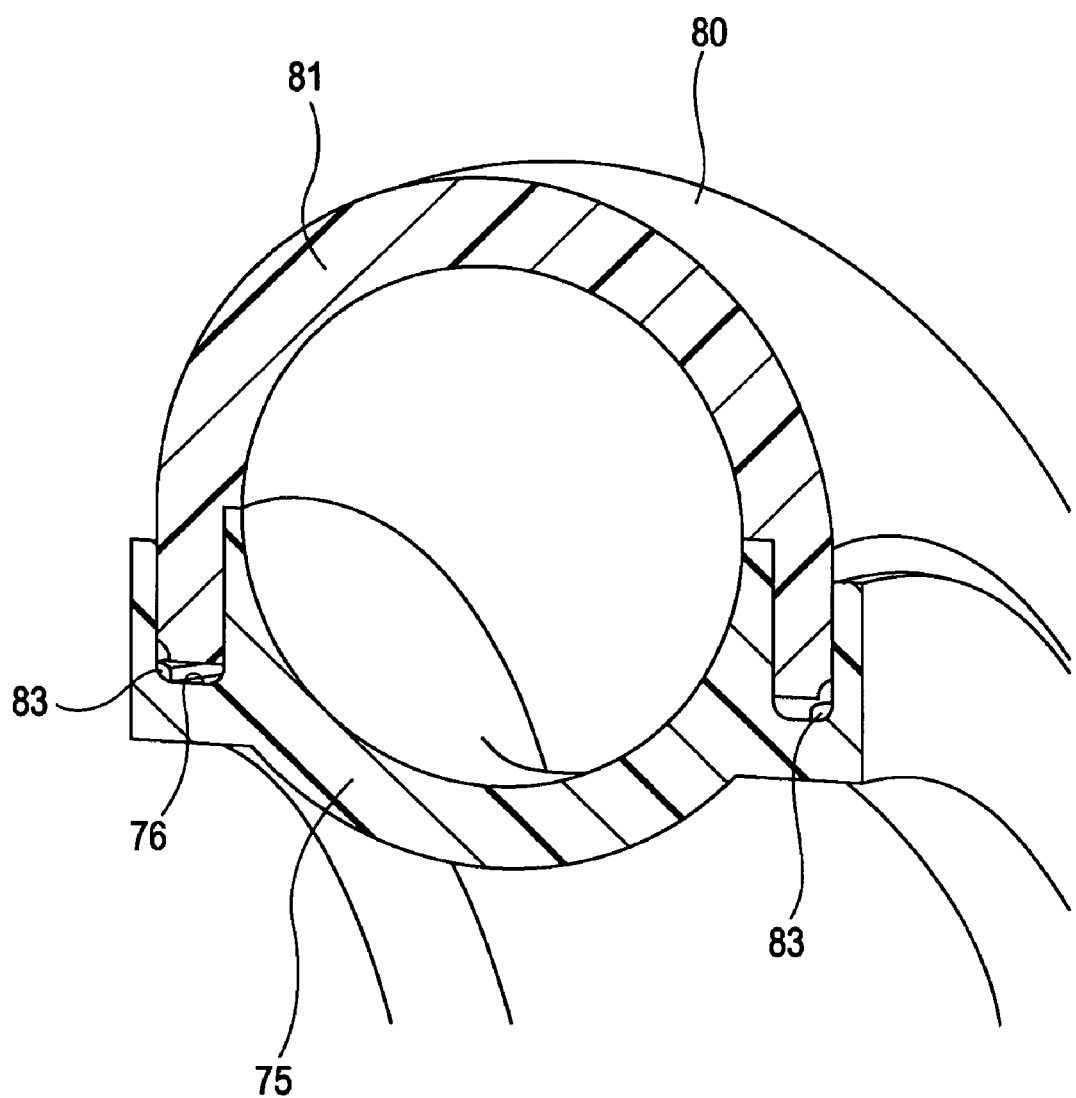
FIG. 8 is a cross-sectional view of the fitting device taken along the line VIII-VIII in FIG. 7.
Figure 9:
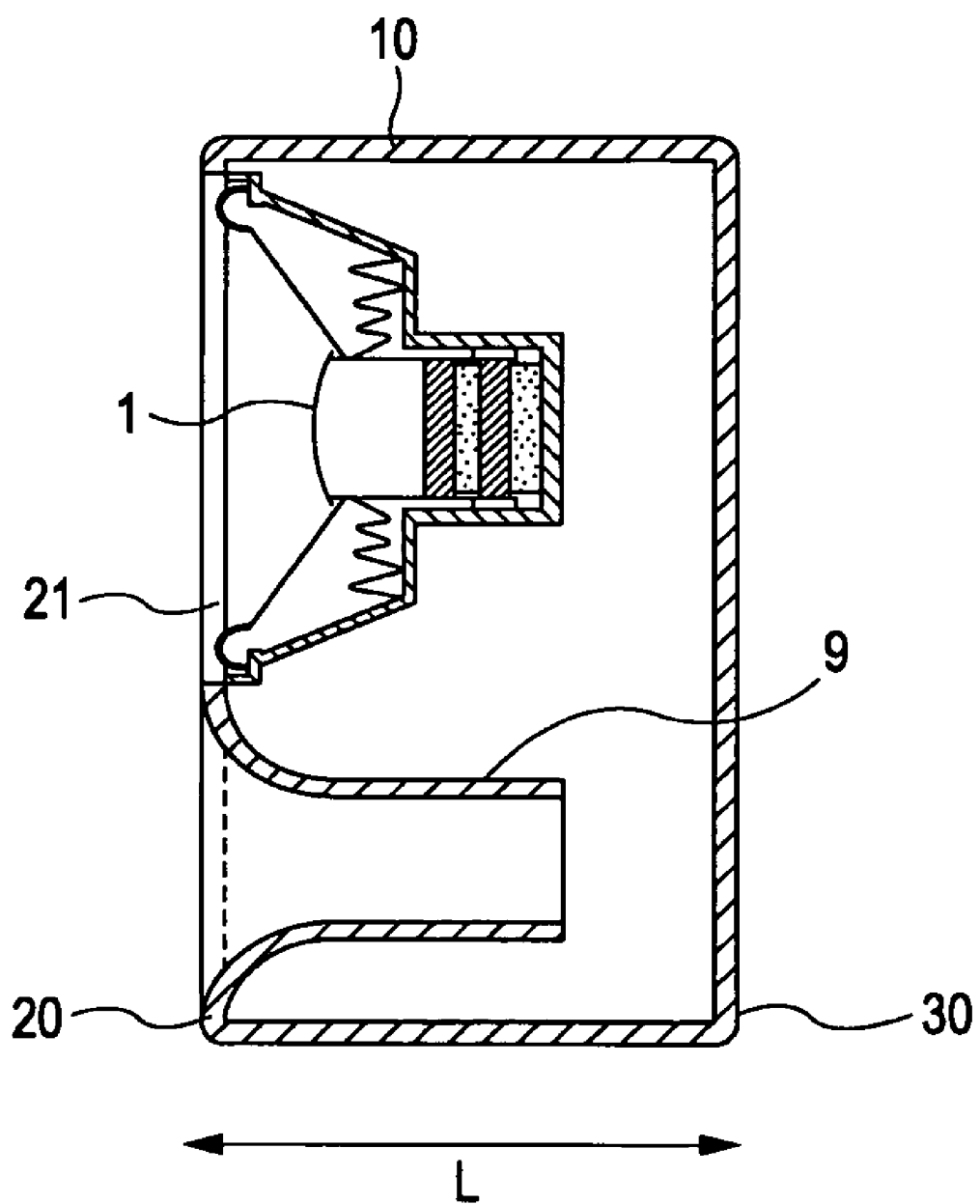
FIG. 9 is a schematic cross-sectional view of a related-art bass-reflex speaker system.

FIGS. 7 and 8 illustrate a fitting device according to an embodiment of the present invention. FIG. 8 is a cross-sectional view taken along the line VIII-VIII in FIG. 7 and corresponds to FIG. 6.

In this embodiment, two tubes 92 and 93, constituting a duct for gas or liquid discharge, arranged in parallel to each other in a housing 91 of an apparatus illustrated on the left of FIG. 7 are connected outside the apparatus.

The fitting device, indicated at 60, according to this embodiment includes a base member 70 and a fitting member 80.

The base member 70 is attached to a window of the housing 91 and is formed by molding, for example, ABS.

The base member 70 corresponds to the rear baffle 30 in the above-described speaker system. In this fitting device 60, two cylindrical portions 72 and 73 are integrated with the base member 70 such that the cylindrical portions 72 and 73 are disposed on the inner surface of the base member 70 on the inside of the apparatus. In addition, a receiving portion 75 having a semicircular cross section is integrated with the base member 70 such that the receiving portion 75 protrudes outward from the outer surface of the base member 70 on the outside of the apparatus while extending from an extension 72a of the cylindrical portion 72 to an extension 73a of the cylindrical portion 73 in a manner similar to the receiving portion 35 of the rear baffle 30 in the foregoing speaker system.

The extension 72a of the cylindrical portion 72a, the receiving portion 75, and the extension 73a of the cylindrical portion 73 have a groove 76 running on the outer end faces of those three components in the same case as the rear baffle 30 in the above-described speaker system. The receiving portion 75 has a plurality of holes 77 for engagement on the outer surface thereof adjacent to the groove 76.

The fitting member 80 having a semicircular cross section is formed by double molding in a manner similar to the fitting member 40 in the foregoing speaker system such that a frame 81 is made of a relatively rigid resin material and a rim 83 is made of a relatively flexible resin material. For example, ABS is used as the resin material for the frame 81 and elastomer is used as the resin material for the rim 83.

The frame 81 has a plurality of projections 82 for engagement such that the projections 82 are disposed on the outer surface of the frame 81 in the vicinity of the rim 83.

The rim 83 of the fitting member 80 and part of the frame 81 adjacent to the rim 83 are inserted into the groove 76 of the base member 70 so that the rim 83 reaches the bottom of the groove 76, and the projections 82 of the fitting member 80 are engaged with the holes 77 of the base member 70.

In this instance, since the rim 83, made of elastomer, of the fitting member 80 is pressed against the bottom, made of ABS, of the groove 76, the rim 83 is deformed by approximately 0.2 mm. Accordingly, the rim 83 is in tight contact with the bottom of the groove 76, thus reliably sealing a pipe assembly composed of the receiving portion 75 and the fitting member 80. In addition, since the projections 82 are engaged with the holes 77, the sealed state is held.

In the fitting device 60 according to this embodiment, while or before the fitting member 80 is fitted to the base member 70 as described above, the cylindrical portions 72 and 73 of the base member 70 are butted against the tubes 92 and 93, respectively, and the base member 70 is then fixed to the housing 91. In the case where the base member 70 is attached to the housing 91 prior to fitting the fitting member 80 to the base member 70, the base member 70 is fixed to the housing 91, and after that, the fitting member 80 is fitted to the base member 70 in the above-described manner.

At that time, for example, a rubber packing is fitted to the end face of each of the tubes 92 and 93 adjacent to the base member 70, respectively, and the cylindrical portions 72 and 73 are butted against the respective rubber packings to seal the interface between the tube 92 and the cylindrical portion 72 and that between the tube 93 and the cylindrical portion 73.

Consequently, the pipe assembly formed by the fitting device 60 between the tubes 92 and 93 can permit a gas or liquid to flow therethrough.

In this embodiment, to remove a foreign matter deposited in the tubes 92 and 93 or clean the inner surfaces of the tubes 92 and 93, while the flow of gas or liquid is temporarily stopped, the projections 82 of the fitting member 80 may be released from the holes 77 to detach the fitting member 80 from the base member 70 by outwardly deforming the receiving portion 75 with the holes 77. Therefore, the foreign matter can be removed from the tubes 92 and 93 and the tubes 92 and 93 can be cleaned.

According to the type of an apparatus or an instrument to which the fitting device 60 is fitted, the base member 70 may have other components in place of the cylindrical portions 72 and 73 in FIG. 7. For example, each end of the receiving portion 75 of the base member 70 may be formed into, for example, an opening portion like the opening portion 32 of the rear baffle 30 in the above-described speaker system.

It should be understood by those skilled in the art that various modifications, combinations, sub-combinations and alterations may occur depending on design requirements and other factors insofar as they are within the scope of the appended claims or the equivalents thereof.

What is claimed is:

1. A speaker system comprising:
   a cabinet;
   a front baffle attached to a front of the cabinet;
   a speaker unit that is attached to a rear of the front baffle and is received in the cabinet;
   a rear baffle attached to a rear of the cabinet; and
   a fitting member fitted in a rear of the rear baffle, wherein
   the front baffle integrally includes a front duct segment such that the segment extends from the rear of the front baffle;
   the rear baffle has an opening portion opposed to a rear of the speaker unit, integrally includes a duct connecting portion opposed to the front duct segment, and integrally includes a receiving portion having a semicircular cross section such that the receiving portion extends from the opening portion to the duct connecting portion while protruding backward;
   the opening portion, the receiving portion, and the duct connecting portion have a groove extending on rear surfaces of the respective portions;
   the receiving portion has a hole for engagement in an outer surface thereof adjacent to the groove;
   the fitting member has a semicircular cross section and is formed by double molding such that a frame of the fitting member is made of a first resin material which is relatively rigid and a rim thereof is made of a second resin material which is relatively flexible;
   the frame has a projection for engagement on the outer surface thereof;
   a rear end face of the front duct segment is butted against a front end face of the duct connecting portion such that the interface therebetween is sealed; and
   the receiving portion and the fitting member constitute a rear duct segment while the rim of the fitting member is inserted into the groove up to the bottom thereof and the projection is engaged with the hole.

2. The system according to claim 1, wherein the rear baffle is formed by molding the first resin material.

3. The system according to claim 1, wherein the first resin material is ABS and the second resin material is elastomer.

4. A fitting device comprising:
   a base member; and
   a fitting member, wherein
   the base member integrally includes a receiving portion having a semicircular cross section such that the receiving portion outwardly protrudes from one surface of the base member;
   the receiving portion has a groove extending around the outer end face thereof and further has a hole for engagement in the outer surface thereof adjacent to the groove;
   the fitting member has a semicircular cross section and is formed by double molding such that a frame of the fitting member is made of a first resin material which is relatively rigid and a rim thereof is made of a second resin material which is relatively flexible;
   the frame has a projection for engagement on the outer surface thereof; and
   the receiving portion and the fitting member constitute a pipe assembly while the rim of the fitting member is inserted into the groove up to the bottom thereof and the projection is engaged with the hole.

5. The device according to claim 4, wherein the base member is formed by molding the first resin material.

6. The device according to claim 4, wherein the first resin material is ABS and the second resin material is elastomer.

* * * * *